United States Patent
McMurtry et al.

[11] 3,875,742
[45] Apr. 8, 1975

[54] GAS TURBINE DUCTED FAN ENGINE

[75] Inventors: David Roberts McMurtry; Kelvin Wilson, both of Bristol, England

[73] Assignee: Rolls-Royce (1971) Limited, London, England

[22] Filed: Mar. 21, 1973

[21] Appl. No.: 343,459

[30] Foreign Application Priority Data
Mar. 21, 1972 United Kingdom............... 13068/72

[52] U.S. Cl.................... 60/226 A; 60/263; 60/271; 60/229; 239/265.31
[51] Int. Cl.......................... F02k 3/06; B64c 15/06
[58] Field of Search...... 60/226 A, 226 R, 229, 271; 239/265.13, 265.29, 265.31, 265.33, 265.37, 265.19

[56] References Cited
UNITED STATES PATENTS

| | | | |
|---|---|---|---|
| 2,947,499 | 8/1960 | Douglas | 239/265.29 |
| 3,303,653 | 2/1967 | Hull | 60/226 A |
| 3,500,646 | 3/1970 | Hom et al. | 60/226 A |
| 3,598,318 | 8/1971 | Schiel | 239/265.29 X |
| 3,599,432 | 8/1971 | Ellis | 60/226 A |
| 3,601,992 | 8/1971 | Maison | 239/265.29 X |
| 3,608,314 | 9/1971 | Colley | 60/226 A |
| 3,721,389 | 3/1973 | MacKinnon et al. | 181/33 |
| 3,747,341 | 7/1973 | Davis | 60/226 A |
| 3,792,584 | 2/1974 | Klees | 60/226 R |

*Primary Examiner*—C. J. Husar
*Assistant Examiner*—Robert E. Garrett
*Attorney, Agent, or Firm*—Stevens, Davis, Miller & Mosher

[57] ABSTRACT

The fan duct of a ducted fan gas turbine engine terminates in a nozzle and a flow splitter is provided which splits the flow through the nozzle into radially outer and inner flow paths. The radially inner flow path terminates in an exit plane downstream of that of the radially outer flow path and is defined between the splitter and the fan duct inner casing. The downstream end of the splitter is provided with a plurality of flaps which are pivotable about their upstream ends to vary the area of the inner flow passage. Additionally, a segment of the splitter, which includes the flaps, is pivotable about a point between its ends to act as a blocker door to divert air flowing down the duct, out of the duct through passages in the duct outer wall.

7 Claims, 5 Drawing Figures

GAS TURBINE DUCTED FAN ENGINE

The present invention relates to gas turbine ducted fan engines, and has particular reference to apparatus for controlling the flow of air through the fan ducts of such engines.

Reference to a ducted fan gas turbine engine should be taken to be reference to an engine having a central, or core, engine driving a multi-bladed fan which is disposed in an annular fan duct.

According to the present invention, there is provided a gas turbine ducted fan engine comprising an annular fan duct which terminates at its downstream end in a nozzle, and within which is disposed an annular flow splitter, the splitter being radially spaced from the fan duct wall to divide the nozzle into radially inner and outer flow passages which terminate in exit planes, the exit plane of the radially inner flow passage lying downstream of the exit plane of the radially outer flow passage, at least a portion of the splitter being circumferentially divided into a plurality of flaps which are pivotable to vary the area of at least one of the flow passages of the nozzle.

Preferably, each flap, or a greater segment of the splitter which includes the flap, is further pivotable so as to be capable of blocking the flow through the duct and of diverting the flow through outlets in the outer wall of the duct.

In a preferred form of the invention, the flaps form the downstream ends of pivotable segments which form the rear portion only of the splitter, and each segment is pivotable, for the purpose of blocking the flow through the duct, at a point intermediate its ends. For the purpose of varying the nozzle area however, the flaps are pivotable at their upstream ends.

Preferably the points about which the two pivoting motions of the segments take place are coincident, and thus in the preferred form of the invention the whole of each segment is pivoted about a point between the ends thereof, while the downstream portion only of each segment is arranged to pivot about the same point.

Also in the preferred form of the invention, the exit plane of the radially outer flow passage of the nozzle is defined between the splitter and the radially outer wall of the fan duct at, or upstream of, the radial plane of the pivot about which the flaps rotate, so as to remain fixed, and the exit plane of the radially inner flow passage of the nozzle is defined between the downstream ends of the flaps and the radially inner wall of the fan duct, so that the nozzle area is variable as the flaps pivot.

The area of the nozzle for the radially outer flow may be varied by the splitter segments by virtue of said pivoting motion, or further means may be provided for varying said area in addition to that of the nozzle for the inner flow.

In one embodiment of the invention the outlets in the duct wall include a cascade of vanes which are covered and uncovered by means of a sliding cowl at the rear of the outer duct wall. The sliding cowl is connected by means of one or more links to the pivoting splitter segments to operate said segments simultaneously with the sliding of the cowl.

Examples of the invention will now be more particularly described with reference to the accompanying drawings in which.

Figure 1:
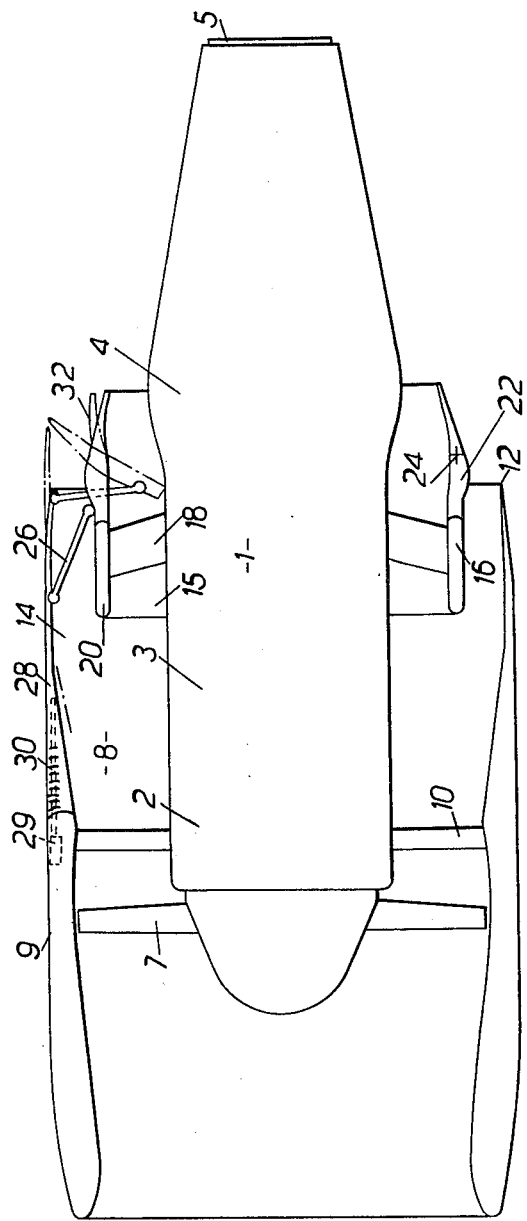
FIG. 1 is a diagrammatic representation of a gas turbine ducted fan engine including the flow controlling apparatus of the present invention.

Referring now to FIG. 1, there is shown a gas turbine ducted fan engine having a core engine 1 which comprises a compressor 2, combustion equipment 3, a turbine 4 and a propulsion nozzle 5 all in flow series. The core engine may be of any desired type since the invention is not concerned with the type of core engine. The core engine provides a hot gas stream for driving a turbine, which in turn drives a multi-bladed fan 7 mounted in an annular duct 8 which is bounded by an outer wall or nacelle 9. Downstream of the fan are vanes 10 which form outlet guide vanes for the fan, and at its downstream end the duct is shaped to define a propulsion nozzle 12.

At the downstream end of the duct 8, the nozzle 12 is divided into a radially outer flow passage 14, and a radially inner flow passage 15, by means of a flow splitter 16 which is supported from the core engine by vanes 18.

The upstream part 20 of the splitter is fixed to the vanes 18 so that it cannot move, but the downstream part of the splitter is divided circumferentially into a plurality of segments 22 which are each pivotably mounted at a point 24 between their ends, for movement about a circumferentially extending axis. By this means the segments can be used as blocker doors for producing a reverse thrust on the engine.

Each segment is attached by means of a drag link 26 to the downstream portion 28 of the outer wall 9 of the duct, and the portion 28 is movable axially by jacks 29 to uncover a cascade of vanes 30 in the outer wall which deflect the flow of air there-through forwardly to produce a reverse thrust on the engine. The operation of the above described moving parts is such that when the wall portion 28 is moved rearwardly, the drag links push the upstream ends of each of the splitter segments radially inwardly, thus pivoting each segment in an anticlockwise direction to block the flow through the fan duct. The flow thus passes out of the duct via the thrust reverser cascade 30.

In addition the downstream part of each segment is made in the form of a separate flap 32, pivotable about its upstream end at a point which coincides with the pivot 24 about which the whole segment is pivoted.

The outer flow passage 14 of the nozzle 12 terminates in an exit plane defined between the outer wall of the fan duct and the splitter, slightly upstream of the radial plane of the pivot 24, and the radially inner flow passage 15 terminates in an exit plane defined between the ends of the flaps 32 and the inner wall of the fan duct downstream of the exit plane of the outer flow passage. Thus the radially outer flow passage 14 terminates in a fixed annular nozzle while the radially inner flow passage 15 has a variable area nozzle. In order to achieve area variation in the inner flow passage, the downstream ends of the flaps must define an exit plane for the inner flow passage downstream of that of the outer flow passage.

Figure 2:
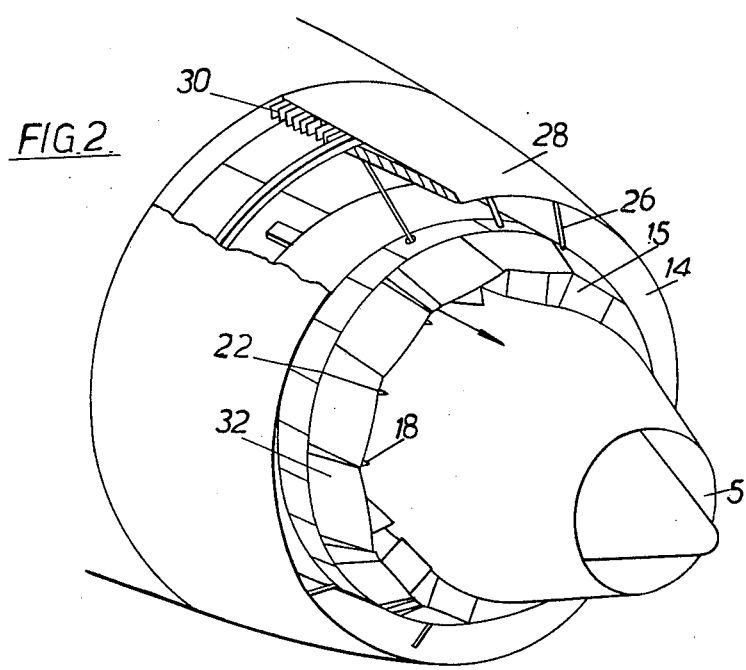
FIG. 2 is a view of the rear of the engine of FIG. 1 showing the splitter segments in the normal forward thrust or cruise position of the engine.
Figure 3:
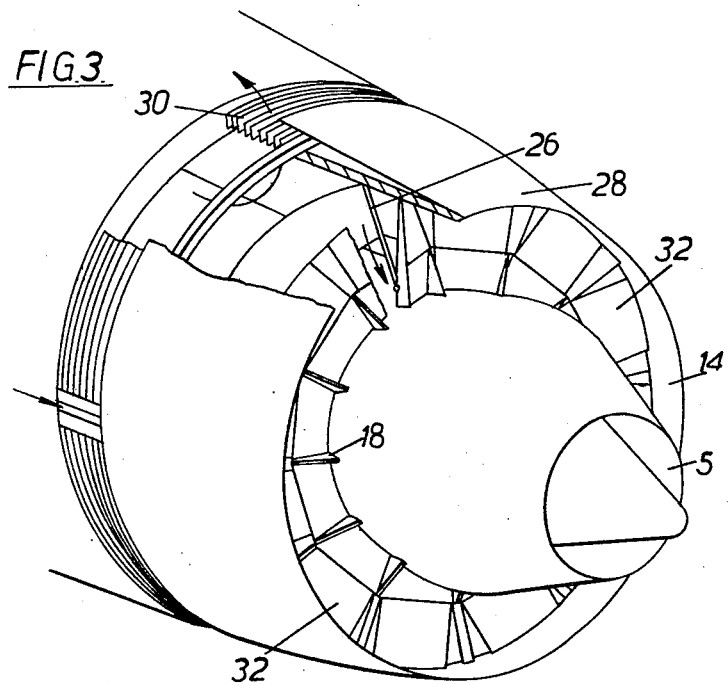
FIG. 3 is a view of the rear of the engine of FIG. 2 showing the splitter segments in the reverse thrust position of the engine.

FIGS. 2 and 3 show the two positions of the splitter segments 22, FIG. 2 showing the normal forward thrust position and FIG. 3 showing the trust reverse position.

Figure 4:
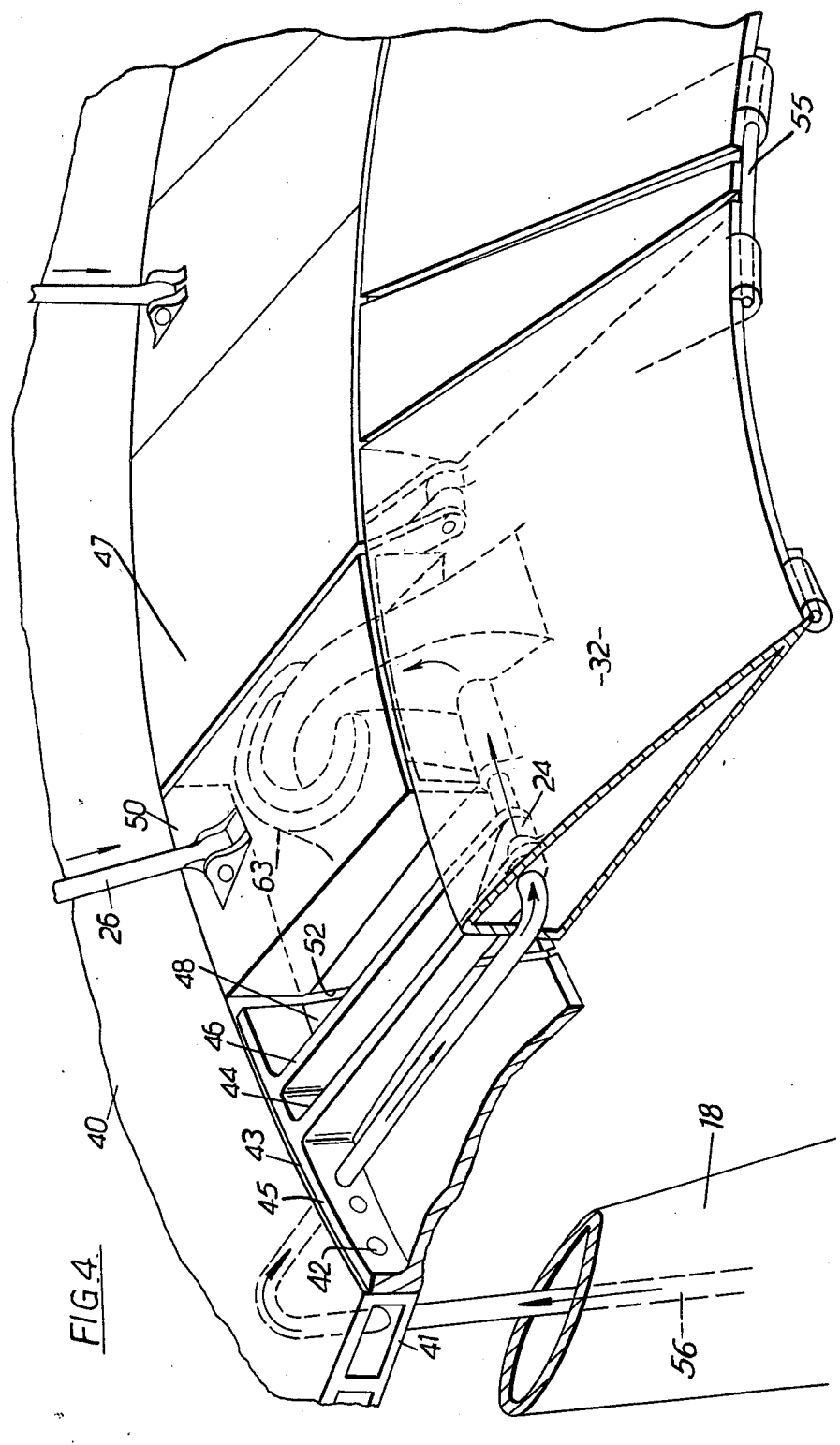
FIG. 4 is an enlarged pictorial view of the splitter segments.

FIG. 4 shows in more detail the construction of the splitter. The upstream portion 20 is a hollow box-section structure having continuous upper and lower skins 40 and 41. The box section is secured by bolts 42 to an end flange 43 of a hollow structure 44 at the radially outer end of each vane 18. The structure includes axially extending ribs 46 which provide support for the pivots 24 about which the splitter segments move.

The structure is covered by a radially outer skin 47 shown cut away at 41, which forms a continuation of the skin 40, and which is rectangular to fit between the radially outer surfaces 50 of the segments 22, and by a radially inner skin 48 which is wedge-shaped to fit between the truncated wedge-shaped skins 52 on the radially inner surfaces of the segments 22.

The splitter segments themselves are hollow structures which are supported only by the pivots 24 and the drag links 26. The upstream portions of each segment have rectangular radially outer skins and truncated wedge-shaped radially inner skins to allow pivoting of the segments between the vanes 18. The downstream portions of the splitter segments, the flaps 32, are hollow structures with radially inner and outer skins which converge in the downstream direction. The flaps are rectangular and there are intermediate flaps 55 disposed between each pair of flaps 32 to seal the gas there-between.

As described above the splitter segments as a whole pivot about the pivots 24 actuated by the moving outer duct wall portion 28 and drag links 26.

The flaps 32, however, are separately actuated by compressed air from a compressor of the engine which is fed via pipes 56 in the vanes 18, through the pivots 24 and into a piston and cylinder arrangement within the splitter segments 22.

Figure 5:
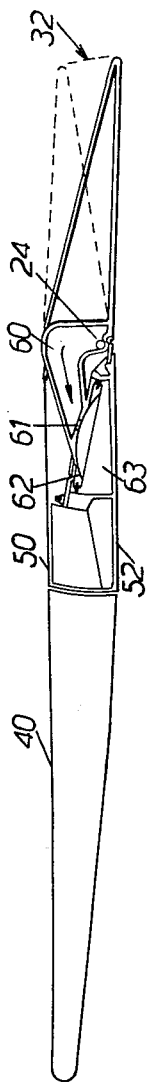
FIG. 5 is a sectional elevation of the splitter of the engine in FIG. 1.

This can be seen in greater detail in FIG. 5. The air from within the pivot passes to the interior of a compartment 60 at the upstream of the flap. The air is fed from the compartment 60, via apertures 61 in the top of a piston 62 integral with the flap, into a cylinder 63 which is formed in the upstream part of the splitter segment, upstream of the pivots 24. When the air pressure is applied to the greater surface area of the underside of the pistons, each piston moves in an arc about its respective pivot point 24 to move the flap to the smaller area position of the nozzle, (shown in full lines). The cylinder is in the form of a sector of a toroid to allow for this arcuate movement of the piston. When the pressure is removed from the cylinder, the forces on the nozzle flaps 32 due to the air pressure on their radially inner surface urge them back to the maximum area position (shown in dotted lines).

Thus where a splitter is needed, to provide adequate surface area for accoustic lining for example, the weight penalty can be offset to a certain extent by making the splitter double not only as a thrust reverser blocker door but also as a variable area nozzle to give added thrust to the engine in the take-off mode of operation.

Depending on the amount of area variation required, various arrangements of the mounting may be adopted.

For example, in one alternative construction the whole of each splitter segment constitutes the flap, the segment being supported in a carrier connected to the segment at a point between its ends so that the segment pivots about this point when acting as a blocker door. The carrier is itself pivotable about its upstream end so that the whole segment thereby pivots about is upstream end to act as a flap for varying the nozzle area.

Additionally other mechanisms may be substituted for the integral piston and cylinder arrangement for pivoting the flaps.

The area of the nozzle in either the inner or outer flow passage may be made to vary by pivoting of the splitter segments and additional means may be provided for varying the area of that nozzle not varied by said pivoting.

We claim:

1. A gas turbine ducted fan engine comprising an annular fan duct; means for defining outlets in the fan duct wall, the fan duct terminating at its downstream end in a nozzle, and within which is disposed an annular flow splitter; means for spacing the splitter radially from the fan duct wall to divide the nozzle into radially inner and outer flow passages which terminate in exit planes, the exit plane of the radially inner flow passage lying downstream of the exit plane of the radially outer flow passage, at least a portion of the splitter being circumferentially divided into a plurality of flaps and there being provided means for pivoting the flaps to vary the area of at least one of the flow passages of the nozzle characterized in that each flap forms at least a portion of a splitter segment and further means are provided for pivoting each segment about a point between its ends to close off the fan duct so as to be capable of diverting air flowing along the duct through said outlets in the fan duct wall.

2. A gas turbine ducted fan engine according to claim 1 and wherein the flaps form the downstream ends of said splitter segments, the means for pivoting the flaps comprising means for pivoting them about their upstream ends independently of the further means for pivoting the segments and wherein the flaps and the segments as a whole pivot about the same pivot axis.

3. A gas turbine ducted fan engine according to claim 2 and wherein pivoting of the splitter segments about a point between their ends is caused by drag links which include means for pivotably connecting them at one of their ends to the splitter segments, and means for pivotably connecting them at the other of their ends to a movable portion of the outer wall of the fan duct, means being provided for translating said movable wall portion axially of the fan duct to cover and uncover said outlets in the fan duct wall and simultaneously to cause pivoting of the splitter segments by means of the drag links.

4. A gas turbine ducted fan engine according to claim 1, and wherein the flaps are pivotable about their upstream end by means of a piston-in-cylinder arrangement which is supplied with fluid under pressure to cause pivoting movement of the flaps.

5. A gas turbine ducted fan engine according to claim 4, and wherein each flap is provided at its upstream end with an integral piston which slides in a toroidal cylinder in the splitter segment.

6. A gas turbine ducted fan engine according to claim 4, and wherein the splitter is supported from the fan duct inner wall by means of a plurality of circumferentially spaced vanes.

7. A gas turbine ducted fan engine according to claim 4, wherein the splitter is supported from the fan duct inner wall by means of a plurality of circumferentially spaced vanes and wherein said vanes are hollow and ducting is provided for conveying said fluid under pressure from the engine to the piston-in-cylinder arrangement, and wherein said ducting passes through the hollow vanes.

* * * * *